United States Patent [19]

Sciamanda et al.

[11] Patent Number: 4,749,864
[45] Date of Patent: Jun. 7, 1988

[54] RADIATION IMAGING SYSTEM USING A GRID

[75] Inventors: Robert J. Sciamanda; William R. Miller, both of Erie, Pa.

[73] Assignee: American Sterilizer Company, Erie, Pa.

[21] Appl. No.: 881,603

[22] Filed: Jul. 3, 1986

[51] Int. Cl.$^4$ .............................................. G01T 1/20
[52] U.S. Cl. ................................. 250/363 S; 250/368; 250/505.1
[58] Field of Search ............... 250/363 S, 361 R, 366, 250/368, 369, 505.1; 378/145, 147, 154

[56] References Cited

U.S. PATENT DOCUMENTS

| | | |
|---|---|---|
| 2,681,868 | 6/1954 | Mason et al. |
| 3,018,375 | 1/1962 | Graves et al. ................ 250/213 |
| 3,048,698 | 8/1962 | Carlson ........................ 250/369 |
| 3,058,021 | 10/1962 | Dunn ............................ 250/213 |
| 3,126,480 | 3/1964 | Bouwers ...................... 250/213 |
| 3,308,438 | 3/1967 | Spergel et al. .............. 250/369 |
| 3,558,893 | 1/1971 | Ball .............................. 250/213 |
| 3,697,795 | 10/1972 | Braun et al. ............ 250/213 VT |
| 3,774,031 | 11/1973 | Mallard et al. .............. 250/503 |
| 3,955,084 | 5/1976 | Giffin ........................... 250/281 |
| 4,015,126 | 3/1977 | Herrington .................. 250/320 |
| 4,142,101 | 2/1979 | Yin ........................... 250/363 R |
| 4,203,037 | 5/1980 | Gur et al. .................... 250/505 |
| 4,210,812 | 7/1980 | Ando et al. .................. 250/416 |
| 4,272,782 | 6/1981 | Proper et al. ............... 358/111 |
| 4,300,046 | 11/1981 | Wang ........................... 250/213 |
| 4,645,918 | 2/1987 | Tsuchiya et al. ....... 250/213 VT |

FOREIGN PATENT DOCUMENTS

| | | |
|---|---|---|
| 0207083 | 10/1985 | Japan ............................ 250/368 |
| 1488829 | 10/1977 | United Kingdom . |
| 2133656 | 7/1984 | United Kingdom . |
| 2165730 | 4/1986 | United Kingdom . |

OTHER PUBLICATIONS

P. Lecomte et al., Channel Electron Multipliers: Properties, Development and Applications, IEEE Transactions Nuclear Science, vol. NS-25, No. 2, Apr. 1978.

L. Yin, J. Trombka, S. Seltzer, R. Webber, M. Farr, and J. Rennie, *The Lixiscope*, Sep. 1978, i–23, NASA Technical Memorandum 79634.

*Basic Medical Radiation Physics*, L. Staton, 1969, pp. 76–79.

*Primary Examiner*—Janice A. Howell
*Attorney, Agent, or Firm*—Kirkpatrick & Lockhart

[57] ABSTRACT

A radiation imaging system comprises a grid for receiving a large field, low intensity, radiation image and for removing scattered radiation therefrom. A device which is responsive to the grid converts the radiation image into a visible light image. A plurality of light conductive fibers with each fiber having an input end and an output end is provided. The input ends are separated by a discrete distance from one another and are in substantial registration with the grid for conducting the visible light image. The output ends are substantially adjacent to one other thereby effecting size reduction of the visible light image. The intensity of the reduced visible light image is increased and the intensified image is output.

5 Claims, 1 Drawing Sheet

RADIATION IMAGING SYSTEM USING A GRID

BACKGROUND OF THE INVENTION

Field of the Invention

The present invention is directed generally to fluoroscopic systems and more particularly to a large field, low intensity, radiation imaging system.

U.S. Pat. No. 4,142,101 to Yin discloses a low intensity x-ray and gamma-ray imaging device. The imaging device includes a phosphor screen for converting an x-ray image into a visible light image. The resulting light is transmitted via an input fiber optic plate to a photocathode where it is converted to electrons. The electrons are accelerated through a vacuum to a microchannel plate image intensifier which multiplies the electrons. The resulting electrons are then converted to light by a second phosphor screen and the light is thereafter directed via an output fiber optic plate to a viewer. The low intensity x-ray and gamma-ray imaging device disclosed in Yin is also described in Yin et al., "The Lixiscope", Nasa Technical Memorandum 79634, September 1978.

The device disclosed in U.S. Pat. No. 4,142,101 has become known as a Lixiscope which stands for low intensity x-ray imaging scope. Lixiscopes are commercially available from HealthMate, Inc., 3000 Dundee Road, Northbrook, Ill. 60062. Lixiscopes provide substantial advantages over traditional x-ray imaging systems Lixiscopes are small, lightweight, and portable. In addition, because of the microchannel plate image intensifier, a very low level source of x-rays or gamma radiation can be used thus reducing the overall cost of the system and decreasing the exposure of the patient. Unfortunately, Lixiscopes are limited to small fields of view, typically about two inches. Thus, Lixiscopes do not compete with large format medical fluoroscopic devices.

Large field x-ray images can be produced by an x-ray image amplifier such as that disclosed in U.S. Pat. No. 2,681,868. Such x-ray image amplifiers allow a large field of view but require sizable x-ray exposure of the patient. Also, the x-ray generator must be sufficiently large to produce the required x-rays which increases the cost of the overall system. Despite the exposure of the patient to a large dosage of x-rays, it is oftentimes necessary to darken the background such that the x-ray image can be properly viewed. Thus, it is desirable to combine the large field of view of traditional fluoroscopic devices with the low radiation exposure, high gain, and low cost of the Lixiscope.

One attempt at combining the large field of view of traditional fluoroscopic devices with the advantages of the Lixiscope is disclosed in U.S. patent application Ser. No. 738,616 for a Large Screen Microchannel Plate Radiation Imaging System filed May 28, 1985, and assigned to the same assignee as the present invention. In U.S. patent application Ser. No. 738,616 a method and apparatus are disclosed in which invisible radiation from a radiation source is passed through an object to form a large field invisible radiation image of the object. The invisible radiation image is converted to a visible light image. The visible light image is reduced in size using lenses, mirrors, fiber optic tapers, or some combination thereof. The reduced visible light image is then intensified and the intensified image may be projected for viewing.

When a fiber optic taper is used for reducing the size of the visible light image, optical fibers are typically subjected to an additional manufacturing step which draws the fibers such that the input ends of the optical fibers have a greater diameter than the output ends of the optical fibers. Although this does effect size reduction, the drawing of the optical fibers results in optical fibers having lower numerical apertures i.e. optical fibers which transmit less light. Also, because of radiation scattered by the object being viewed, the image of the object may be blurred. This blurring may be reduced by using a grid. However, the grid, in addition to eliminating the scattered radiation, also prevents some of the desired radiation from being transmitted which may result in degradation of the image and loss of brightness. Finally, if the grid is not oscillated during exposure of the object to the radiation, the grid pattern will be superimposed on the resulting image.

A different approach to providing a large field, low intensity, radiation imaging apparatus centers around the reduction of the electron image corresponding to the radiation image of interest rather than the reduction of the visible light image as set forth in the above-identified patent application. An apparatus directed to the approach of reducing the size of the electron image is disclosed in U.S. patent application Ser. No. 849,907 for a Large Field, Low Intensity, Radiation Imaging System filed Apr. 9, 1986, and assigned to the same assignee as the present invention. The apparatus disclosed in that patent application converts a radiation image to an electron image. Circuitry is provided for reducing the size and increasing the intensity of the electron image. Additional circuitry outputs the increased intensity electron image.

The apparatus of Ser. No. 849,907 may suffer from degradation of the output image due to scattered radiation. Although the scattered radiation may be substantially eliminated by the use of a grid, the grid will also interfere with certain of the radiation which is a portion of the image to be viewed. Thus, the grid will result in signal degradation and grid lines will be superimposed on the image as in U.S. patent application Ser. No. 738,616. Oscillation of the grid washes the grid lines from the image but also degrades the image and results in loss of brightness.

It therefore remains desirable to provide a large field, low intensity, radiation imaging system which takes advantage of the improvements provided by using a grid but which does not suffer from any degradation of output or loss of brightness as a result of using the grid.

SUMMARY OF THE PRESENT INVENTION

The present invention is directed to a radiation imaging system having a grid for receiving a large field, low intensity, radiation image which removes scattered radiation therefrom. A device is provided which is responsive to the grid for converting the radiation image into a visible light image. A plurality of light conductive fibers with each fiber having an input and an output end is provided. The input ends are separated a discrete distance from one another and are in substantial registration with the grid for conducting the visible light image. The output ends are substantially adjacent to one another thereby effecting size reduction of the visible light image. An amplifier intensifies the reduced visible light image. A device is provided for outputting the intensified image.

According to one embodiment of the present invention the grid includes a grid having circular openings. The input ends of the plurality of light conductive fibers are in substantial registration with the circular openings. The device for converting the radiation image into a visible light image includes a phosphor material positioned on the input ends of the plurality of light conductive fibers.

The apparatus of the present invention provides an improved, large field, low intensity, radiation imaging system by virtue of the use of the grid and fanned fiber optic taper. The grid removes scattered radiation from the radiation image thereby improving the quality of the output image. Because of the fanned nature of the plurality of optical fibers, the grid may be positioned in the spaces between the input ends of the light conductive fibers such that the grid does not result in any loss of signal. Because of the positioning of the grid, no grid lines appear in the output image thus obviating the need for oscillation of the grid as found in prior art devices. Because of the fanned nature of the fiber optic taper, each optical fiber has a constant numerical aperture. Also, less glass is used and manufacturing steps which are easier than the tapering of each optical fiber are used which leads to overall weight and cost reductions. These and other advantages and benefits of the present invention will become apparent from the description of a preferred embodiment hereinbelow.

BRIEF DESCRIPTION OF THE DRAWINGS

In order that the present invention may be clearly understood and readily practiced, a preferred embodiment will now be described, by way of example only, with reference to the accompanying figures wherein.

DESCRIPTION OF A PREFERRED EMBODIMENT

Figure 1:
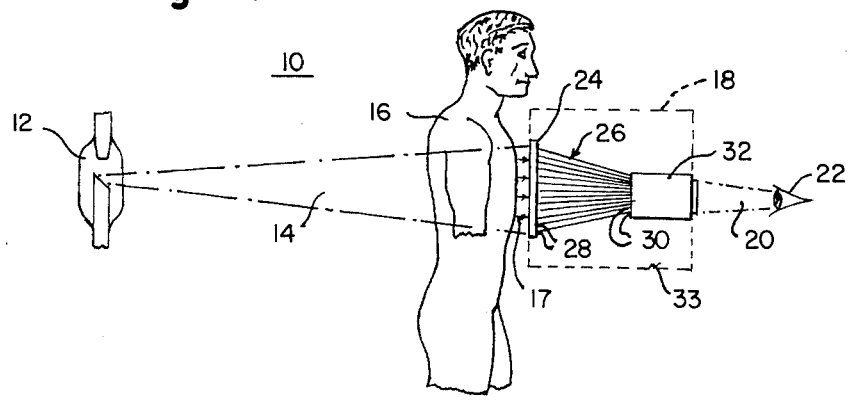
FIG. 1 illustrates the radiation imaging system of the present invention.

A radiation imaging system 10 constructed according to the teachings of the present invention is illustrated in FIG. 1. Although the radiation imaging system 10 is illustrated in FIG. 1 in a clinical environment, the radiation imaging system 10 of the present invention is also suited for providing x-ray images in a variety of industrial applications including the inspection of airline luggage and the inspection of manufactured items for defects. The illustration of the radiation imaging system 10 of the present invention in a clinical environment is not intended as a limitation. It should be appreciated that the present invention may be used with other kinds of invisible radiation in a variety of applications requiring a visible light image of the image produced by passing invisible radiation through an object.

In FIG. 1 the radiation imaging system 10 is comprised of a source 12 of x-rays 14. The source 12 shown in FIG. 1 is an x-ray tube, although any suitable source of low level radiation may be used. The x-rays pass through a subject 16 to thereby provide a radiation image 17 which is input to a radiation imaging apparatus 18 constructed according to the teachings of the present invention. The x-ray imaging apparatus 18 of the present invention reduces the size of the large field, low intensity, radiation image 17 and provides an intensified visible light image 20 corresponding to the x-ray image 17. The intensified visible light image 20 may be viewed by a user 22, input to a camera (not shown), or input to any other suitable device.

The radiation imaging apparatus 18 of the present invention is comprised primarily of a grid 24, a plurality of light conducting fibers 26 each having an input end 28 and an output end 30, and an image intensifier 32 all housed within a housing 33 (shown in broken lines) which effectively seals the imaging apparatus 18. The image intensifier 32 may be a commercially available type of microchannel plate image intensifier such as those available from Varo, Inc., Electron Devices Division, located at 2203 West Walnut Street, P.O. Box 469014, Garland, Tex. Such an image intensifier uses a microchannel plate to produce an intensified image in a known manner. Because commercially available image intensifiers 32 typically have input diameters on the order of two inches, it is necessary to effect size reduction of the x-ray image 17. This is accomplished by virtue of the positioning of the plurality of light conductive fibers 26 as shown in FIG. 2.

Figure 2:
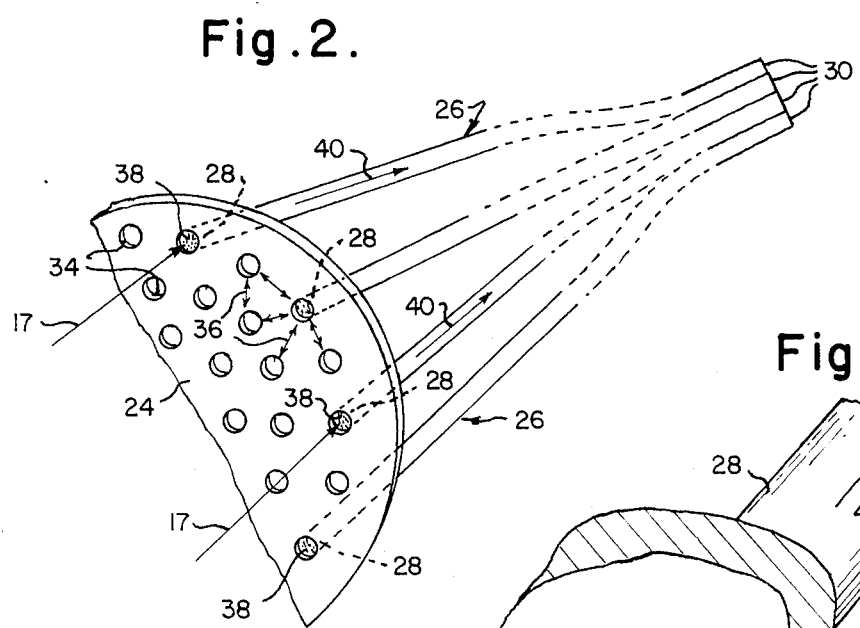
FIG. 2 illustrates a portion of the plurality of light conductive fibers and a portion of the grid of the present invention.

In FIG. 2 a portion of the grid 24 and a portion of the plurality of light conductive fibers 26 are illustrated. It should be recognized that the diameter of the light conductive fibers with respect to the size of the grid 24 has been greatly exaggerated for purposes of illustration. The diameter of each of the fibers of the plurality of light conductive fibers 26 may be on the order of five microns which is constant over the length of the fiber. However, any suitable diameter of light conductive fiber may be used. The portion of the grid 24 illustrated in FIG. 2 is a portion of a circular grid. The grid 24 of the present invention need not be circular but may take any suitable form.

The portion of the grid 24 illustrated in FIG. 2 is provided with a plurality of openings 34. The input end 28 of each of the plurality of light conductive fibers 26 is positioned in substantial registration with one of the openings 34 of the grid 24. Although only four light conductive fibers are illustrated in FIG. 2, the reader should recognize that each of the openings 34 will have a corresponding light conductive fiber. By virtue of the correspondence of the input ends 28 with the openings 34 in the grid 24, the input ends 28 of the plurality of light conductive fibers 26 are separated by discrete distances 36 from one another. The output ends 30 of the plurality of light conductive fibers 26 are positioned substantially adjacent to one another. This causes the plurality of light conductive fibers 26 to have a fanned configuration as shown in FIG. 2. Such a fiber optic taper, produced by varying the spacing between the fibers rather than varying the diameter of the fibers, is available from Tru Lyte Systems, Inc., located at 327 S. Walnut Street, Beaver, PA 15009.

Each of the input ends 28 of the plurality of light conductive fibers 26 has a phosphor material 38 painted, brushed, or otherwise deposited thereon. The phosphor material 38 may be any of several known types of material for converting the radiation image 17 into a visible light image 40. By virtue of the fanned configuration of the plurality of light conductive fibers 26, the visible light image 40 is reduced in size as it travels from the input ends 28 to the output ends 30 of the plurality of light conductive fibers 26. In this manner, size reduction of the x-ray image 17 is accomplished such that the visible light image 40 is of an appropriate size to be input to the image intensifier 32. Those of ordinary skill in the art will recognize that the discrete distances 36 between the input ends 28 of the plurality of light conductive fibers 26 will depend upon such factors as the size of the x-ray image 17, the size of the visible light image 40 which the image intensifier 32 will accept, and the number and diameter of the plurality of light conductive fibers 26. After the visible light image 40 has been reduced to an appropriate size, it is input to the image intensifier 32 which produces the intensified visible light image 20.

Figure 3:
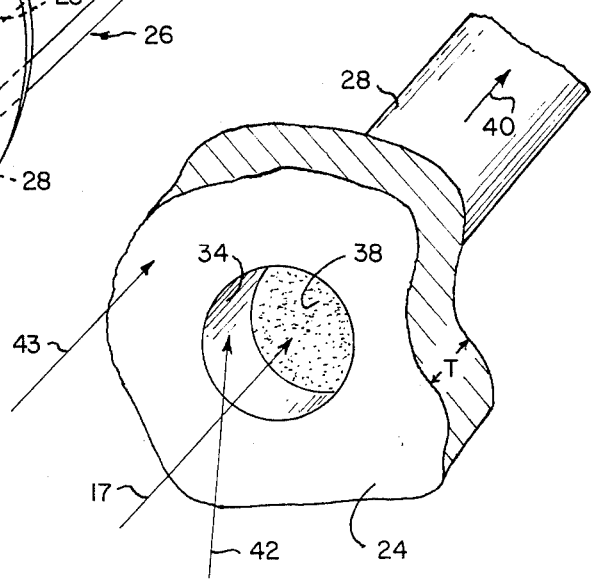
FIG. 3 illustrates how the grid removes scattered radiation.

The operation of the grid 24 is shown in detail in FIG. 3 wherein a portion of the grid 24 having one opening 34 is illustrated. The opening 34 is in substantial registration with the input end 28 of one of the plurality of light conductive fibers 26 as discussed above. Portions of the radiation from the x-ray image 17 strike the phosphor material 38 thereby producing the visible light image 40. However, as is known, the subject or object being examined tends to scatter a portion of the x-rays. One such scattered x-ray 42 is illustrated in FIG. 3. Because this scattered x-ray 42 is not parallel to the walls of the opening 34, it strikes the walls of the opening 34. Because the grid 24 is constructed of a material, such as lead, which absorbs x-rays the scattered x-ray 42 is absorbed. In this manner, the grid 24 receives the large field, low intensity, radiation image 17 and removes scattered radiation therefrom. In the embodiment shown in FIGS. 2 and 3, the grid has the effect of columniating the radiation forming the radiation image 17.

Those of ordinary skill in the art will recognize that a certain portion 43 of the x-ray image 17 will strike the grid 24 in a position where there is no opening 34. This portion of the x-ray image will be lost. However, because there is no light conductive fiber corresponding to that portion of the grid, that portion 43 of the radiation image 17 would have been lost in any event. Therefore, use of the grid 24 does not cause any additional image degradation. Because of the discrete distances 36 between the input ends 28 of the plurality of light conductive fibers 26, no image of the grid 24 appears in the visible light images 40 and 20. The use of the grid 24 in combination with the tapered construction of the plurality of light conductive fibers 26 represents a substantial advantage over the prior art in that scattered radiation can be eliminated from the x-ray image 17 without causing any degradation of the visible light image 40 and without causing the appearance of an image corresponding to the grid in the visible light 40.

The thickness T of the grid 24 is determined by several factors including, but not limited to, the amount of scattered radiation 42 which is to be removed from the x-ray image 17, the cost of the apparatus 18, as well as the weight of the apparatus 18. Those of ordinary skill in the art will recognize that other grid configurations may be used without departing from the spirit and scope of the present invention.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. A large field, low intensity, radiation imaging system, comprising:
   grid means for receiving a large field, low intensity, radiation image and for removing scattered radiation therefrom;
   means responsive to said grid means for converting said radiation image into a visible light image;
   a plurality of light conductive fibers each having an input end and an output end, said input ends being separated a discrete distance from one another and being in substantial registration with said grid means for conducting said visible light image, said output ends being substantially adjacent to one another to thereby effect size reduction of said visible light image;
   means for intensifying said reduced visible light image; and
   means for outputting said intensified image.

2. The system of claim 1 wherein said grid means includes a grid having circular openings, said input ends of said plurality of light conductive fibers being in substantial registration with said circular openings.

3. The system of claim 2 wherein said means for converting said radiation image into a visible light image includes a phosphor material positioned on said input ends of said plurality of light conductive fibers.

4. The system of claim 3 wherein said means for intensifying includes a microchannel plate amplifier.

5. The system of claim 1 additionally comprising a source of low intensity x-rays for producing said low intensity radiation image.

* * * * *

UNITED STATES PATENT AND TRADEMARK OFFICE
CERTIFICATE OF CORRECTION

PATENT NO. : 4,749,864
DATED : June 7, 1988
INVENTOR(S) : Robert J. Sciamanda and William R. Miller It is certified that error appears in the above-identified patent and that said Letters Patent is hereby corrected as shown below:

Cover page, Col. 2, line 9, under Other Publications, delete "vol." and substitute therefor --Vol.--.

Col. 1, line 31, after "tems", insert --. --.

Signed and Sealed this

Fourteenth Day of March, 1989

Attest:

DONALD J. QUIGG

*Attesting Officer*  *Commissioner of Patents and Trademarks*